US011675539B2

(12) United States Patent
Sure et al.

(10) Patent No.: US 11,675,539 B2
(45) Date of Patent: Jun. 13, 2023

(54) FILE SYSTEM OPERATIONS FOR A STORAGE SUPPORTING A PLURALITY OF SUBMISSION QUEUES

(71) Applicant: International Business Machines Corporation, Armonk, NY (US)

(72) Inventors: Ravindra R. Sure, Bangalore (IN); Samrat P. Kannikar, Bangalore (IN); Sukumar Vankadhara, Bangalore (IN); Sasikanth Eda, Vijayawada (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 17/338,507

(22) Filed: Jun. 3, 2021

(65) Prior Publication Data
US 2022/0391135 A1 Dec. 8, 2022

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/0683
See application file for complete search history.

(56) References Cited

U.S. PATENT DOCUMENTS

| 2012/0158882 | A1* | 6/2012 | Oehme | G16H 30/20 709/213 |
| 2013/0117286 | A1* | 5/2013 | Gallant | G06F 3/0614 707/752 |
| 2013/0185495 | A1* | 7/2013 | Benhase | G06F 12/0246 711/E12.078 |
| 2014/0281050 | A1* | 9/2014 | Vogan | G06F 3/0659 710/14 |

(Continued)

OTHER PUBLICATIONS

Miranda, "NORNS: Extending Slurm to Support Data-Driven Workflows through Asynchronous Data Staging" dated 2019, IEEE International Conference on Cluster Computing (CLUSTER), Total 13 pages.

*Primary Examiner* — Charles Rones
*Assistant Examiner* — Tong B. Vo
(74) *Attorney, Agent, or Firm* — Konrad Raynes Davda & Victor LLP; Rabindranath Dutta

(57) ABSTRACT

A computational device configures a storage system that supports a plurality of submission queues. A file system monitors characteristics of received writes to distribute the writes among the plurality of submission queues. The computational device categorizes the writes into full track writes, medium track writes, and small track writes, measures a frequency of different categories of writes determined based on the categorization of the writes, and generates arbitrations of the writes with varying priorities for distributing the writes for processing in the submission queues. A full track write includes writing incoming data blocks of the writes received to a fresh track, in response to a total size of the (Continued)

incoming data blocks being equal to or more than a size of one full track. A medium track write includes overwriting an existing data track. A small track write includes staging the incoming data blocks to a caching storage.

18 Claims, 10 Drawing Sheets

(56) References Cited

U.S. PATENT DOCUMENTS

| | | |
|---|---|---|
| 2016/0283116 A1* | 9/2016 | Ramalingam ......... G06F 3/0629 |
| 2017/0371828 A1* | 12/2017 | Brewer ................... G06F 13/28 |
| 2019/0129876 A1 | 5/2019 | Trika |
| 2020/0089537 A1* | 3/2020 | Bahirat ................... G06F 9/468 |
| 2020/0097183 A1 | 3/2020 | Rawal et al. |
| 2020/0343974 A1 | 10/2020 | Dreier |
| 2020/0409878 A1* | 12/2020 | Liu ..................... G06F 13/1668 |
| 2021/0255803 A1* | 8/2021 | Kanno ................. G06F 3/0656 |
| 2022/0221987 A1* | 7/2022 | Noh ...................... G06F 3/0643 |
| 2022/0276799 A1* | 9/2022 | Kumar ................. G06F 3/0643 |

* cited by examiner

FILE SYSTEM OPERATIONS FOR A STORAGE SUPPORTING A PLURALITY OF SUBMISSION QUEUES

BACKGROUND

1. Field

Embodiments relate to file system operations for a storage supporting a plurality of submission queues.

2. Background

Software implemented Redundant Array of Independent disks (RAID) may be used to control standard serial-attached small computer system interface (SCSI) disks in just a bunch of disks (JBOD) arrays, which provides for cost reduction, with the option of using solid-state drives (SSD) when greater performance is needed. Such software implemented RAIDs may not need or use any type of external RAID controller or acceleration. Software implemented RAIDs may also support multiple RAID codes and may distribute client data, redundancy information, and spare space across disks in a way such that if there a physical disk loss, there is no effect on data availability.

Non-volatile memory express (NVMe) replaces the traditional SCSI protocol for communicating with disk drives by offering a high-speed interface between a host and disk drives. Architecturally, the logic for NVMe may be executed by a NVMe controller that controls the storage media comprising one or more SSDs.

SUMMARY OF THE PREFERRED EMBODIMENTS

Provided are a method, system, and computer program product in which a computational device configures a storage system that supports a plurality of submission queues. A file system of the computational device monitors characteristics of writes received from an application to distribute the writes among the plurality of submission queues of the storage system.

In additional embodiments, the writes are categorized into full track writes, medium track writes and small track writes. A frequency of different categories of writes is measured, and based on the frequency, a generation of arbitrations of the writes is performed with varying priorities for distributing the writes for processing in the plurality of submission queues.

In further embodiments, a monitoring of a type of writes received from the application is performed. An estimation of an importance of the writes during a time period is performed to determine whether the writes are to be flushed substantially immediately to disk or the writes are to be maintained in a virtual queue.

In additional embodiments, queue depths are altered dynamically for groups of queues channeled for a write category, to push data to NVMe solid state drives or to hold the data in virtual queues associated with the write category.

In certain embodiments, a monitoring is performed of processor core performances and the processor cores are ranked based on monitoring history. An application associates a highest priority submission queue to a highest ranked processor core for processing of the writes.

In further embodiments, the storage system is comprised of NVMe devices.

In yet further embodiments, by distributing the writes among the plurality of submission queues of the storage system based on the characteristics of writes received from the application, performance of the storage system is improved in comparison to distributing the writes randomly among one or more submission queues.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In the traditional SCSI protocol, there is only one submission queue that is capable of accommodating 64K input/output (I/O) commands. NVMe may support a maximum of 64K I/O queues and 64K I/O commands may be queued in each I/O queue. The queues may be assigned a priority and the I/O commands that are queued up in a higher priority queue may be executed prior to the I/O commands that are queued up in a lower priority queue.

Clustered filesystems (e.g., software implemented RAIDs) are designed in a way such that the underneath storage, disks, arrays do not matter and work seamlessly. However, with the advent of NVMe the situation has changed, and clustered filesystems need tighter integration to exploit the superior performance of NVMe provided by at least the support of the plurality of I/O queues referred to as submission queues.

Certain embodiments provide mechanisms for performing at least the following by a clustered file system in cooperation with a NVMe controller:
1. Appropriate write channeling to NVMe queues based on a set arbitration priority;
2. Dynamically changing NVMe queue associations with processor cores, based on the variations of application workloads; and
3. Dynamically change NVMe queue depths based on the write pattern received during a time period.

Certain embodiments improve the operations of a computational device by providing a framework that may be integrated with a clustered filesystem using a NVMe backend, to improve performance by leveraging hints related to application workload changes and by channeling writes to NVMe queues based on a plurality of factors, such as a queue priority vs. a write performance that is demanded, a queue depth vs. a write type, a queue association change based on processor core performance, etc.

Exemplary Embodiments

Figure 1:
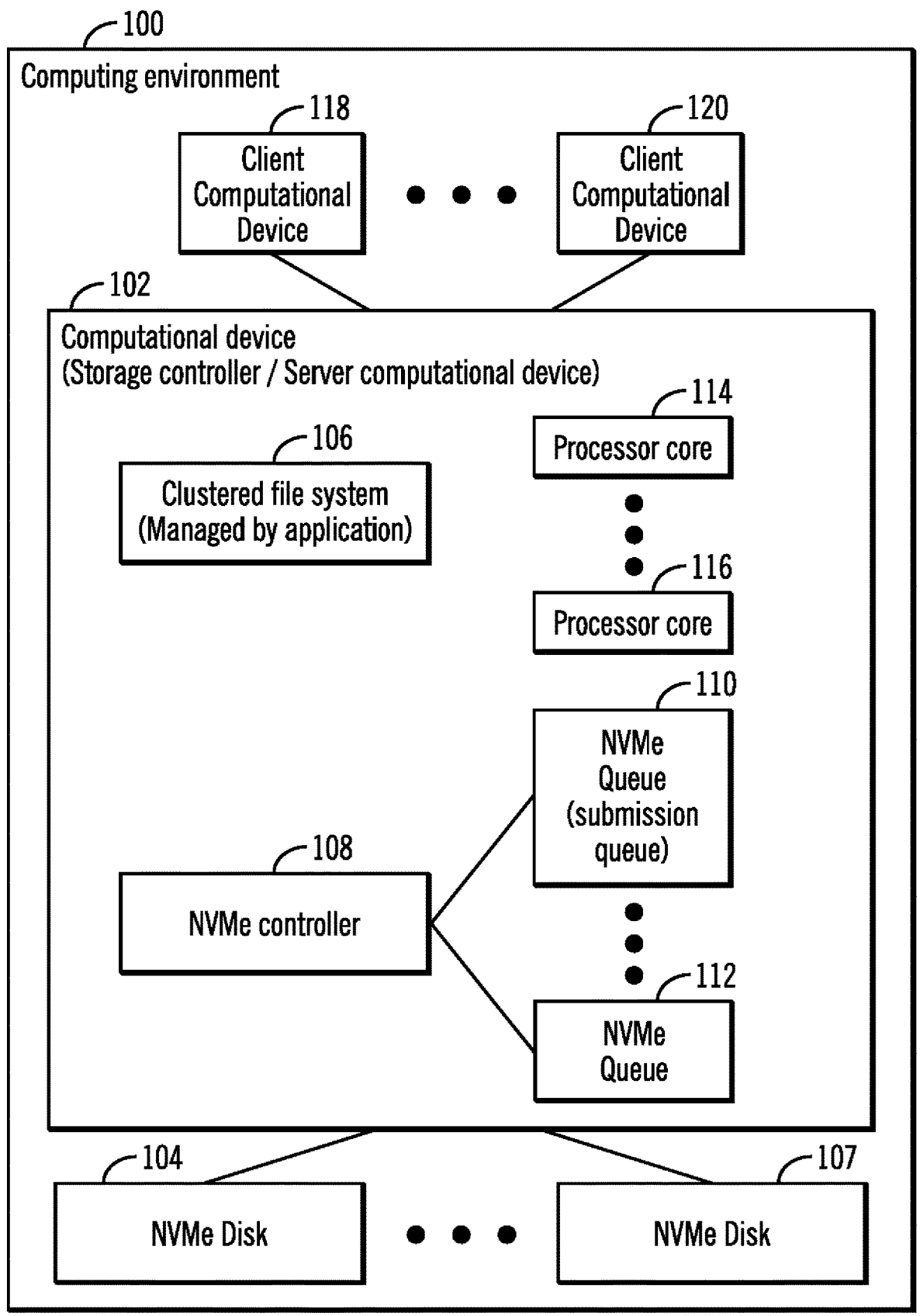
FIG. 1 illustrates a block diagram of a computing environment comprising a computational device coupled to one or more NVMe disks, in accordance with certain embodiments.

FIG. 1 illustrates a block diagram of a computing environment 100 comprising a computational device 102 coupled to a plurality of NVMe disks 104, 107, in accordance with certain embodiments. In certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The computational device 102 and the NVMe disks 104, 107 may be elements in any suitable network, such as, a storage area network, a wide area network, the Internet, an intranet, etc. In certain embodiments, the computational device 102 and the NVMe disks 104, 107 may be elements in a cloud computing environment. The NVMe disks 104, 107 or the corresponding drives may also be referred to as NVMe devices.

A clustered file system 106 is implemented in the computational device 102, in accordance with certain embodiments. The clustered file system 106 may be comprised of or managed by an application implemented in software, hardware, firmware, or any combination thereof, in accordance with certain embodiments.

A NVMe controller 108 may be implemented to control the NVMe disks 104, 107. The NVMe controller 108 may maintain a plurality of NVMe queues 110, 112 where a plurality of processor cores 114, 116 may be associated with the plurality of NVMe queues 110, 112. The NVMe queues 110, 112 are also referred to as submission queues. NVMe queues may also comprise completion queues in addition to submission queues.

A plurality of client computational devices 118, 120 may send I/O commands received by the computational device 102 that may comprise a server computational device or a storage controller. The computational device 102 uses the clustered file system 107 to exploit the functions provided by the NVMe controller 108 to efficiently process the received I/O commands. The received I/O commands may ultimately cause data to be read from or written to the NVMe disks 104, 107, although the embodiments presented in this disclosure primarily pertain to writes performed by the received I/O commands.

Figure 2:
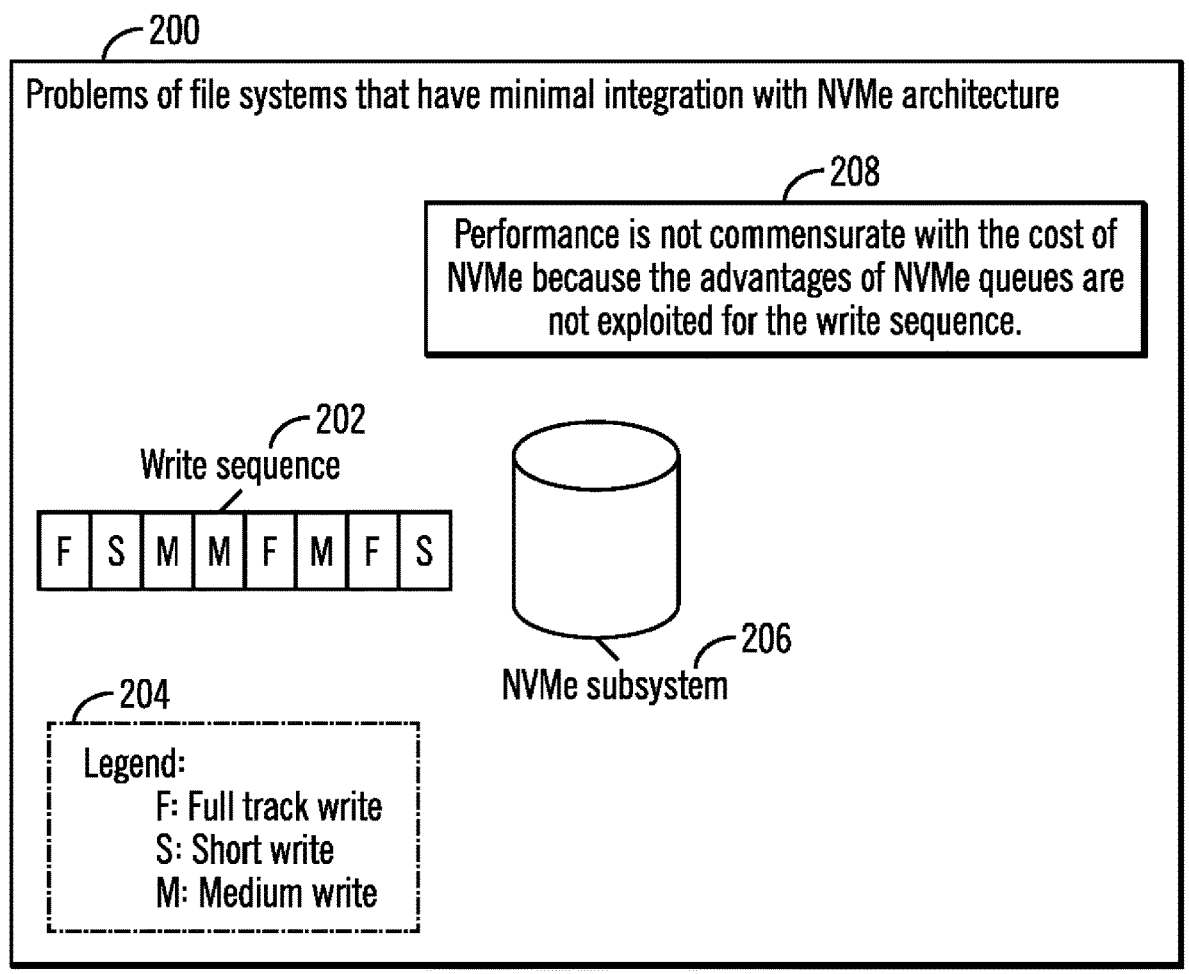
FIG. 2 illustrates a block diagram that shows problems with traditional file systems that have minimal integration with NVMe architecture, in accordance with certain embodiments.

FIG. 2 illustrates a block diagram 200 that shows problems with file systems that have minimal integration with NVMe architecture, in accordance with certain embodiments.

In certain embodiments, an advanced write pattern grouping is used with a high-performance clustered file system. In such a system, incoming writes from a client computational device to the file system may be categorized into three categories:
1. A full track write;
2. A short write; and
3. A medium write.

If the total size of the incoming data blocks is equal to or more than the size of one full track, then these blocks are written to a fresh track (this mechanism is referred to as 'full track write'). The data blocks are immediately flushed to the RAID disks and a success acknowledgement is sent to client after flush is complete. The latency of full track write is more than the latency in the other categories because acknowledgement is not sent to the client computational device or client application until all the data and parity blocks are written to the respective disks.

If the size of incoming data blocks is very small, then these blocks are not immediately flushed to the RAID disks. Rather, these blocks are staged to an intermediate fast caching disk (this mechanism is referred to as a 'short write').

If the size of data blocks lies between small write and full track write, then it is classified as a 'medium write'. A medium write can be an overwrite to an existing track or it can be combined with some other data blocks and written as a full track write. In the latter case, it is called as promoted full track write. In either case, the data blocks are to be flushed to the disks and only after that an acknowledgement can be sent to the client computational device or the client application for indicating success or failure.

In FIG. 2, a write sequence 202 comprising a sequence of full track writes (depicted as F in accordance with legend 204), short writes (depicted as S in accordance with legend 204), and medium writes (depicted as M in accordance with legend 204) are shown. The NVMe subsystem 206 is comprised of the NVMe controller 108 and the NVMe disks 104, 107 that provide NVMe queues, but no advantage is taken of such NVMe queues to exploit the differences of the full track writes, short writes, and medium writes for allocation of I/O writes to the NVMe queues. As a result, such file systems that have minimal integration with NVMe architecture may exhibit little or no superiority in performance that is commensurate with the cost of NVMe (as shown via reference numeral 208). The performance is not commensurate with the cost of NVMe because the advantages of NVMe queues are not exploited for the processing of the write sequence 202.

Clustered file systems are designed in a way such that the underneath storage comprised of disks, arrays, etc. do not matter and works seamlessly. However, with the advent of NVMe, the clustered filesystem does need tighter integration to achieve superior performance that matches with the cost of NVMe in comparison to cheaper but slower hard disks, etc. Below are some of the gaps in currently available mechanisms:
1. Lack of appropriate write channeling to NVMe queues based on the set arbitration priorities;
2. Lack of appropriate infrastructure to dynamically change NVMe queue associations with cores based on the variations of application workloads; and 3. Lack of appropriate infrastructure to dynamically change NVMe queue depth based on the write pattern received during a time period.

Figure 3:
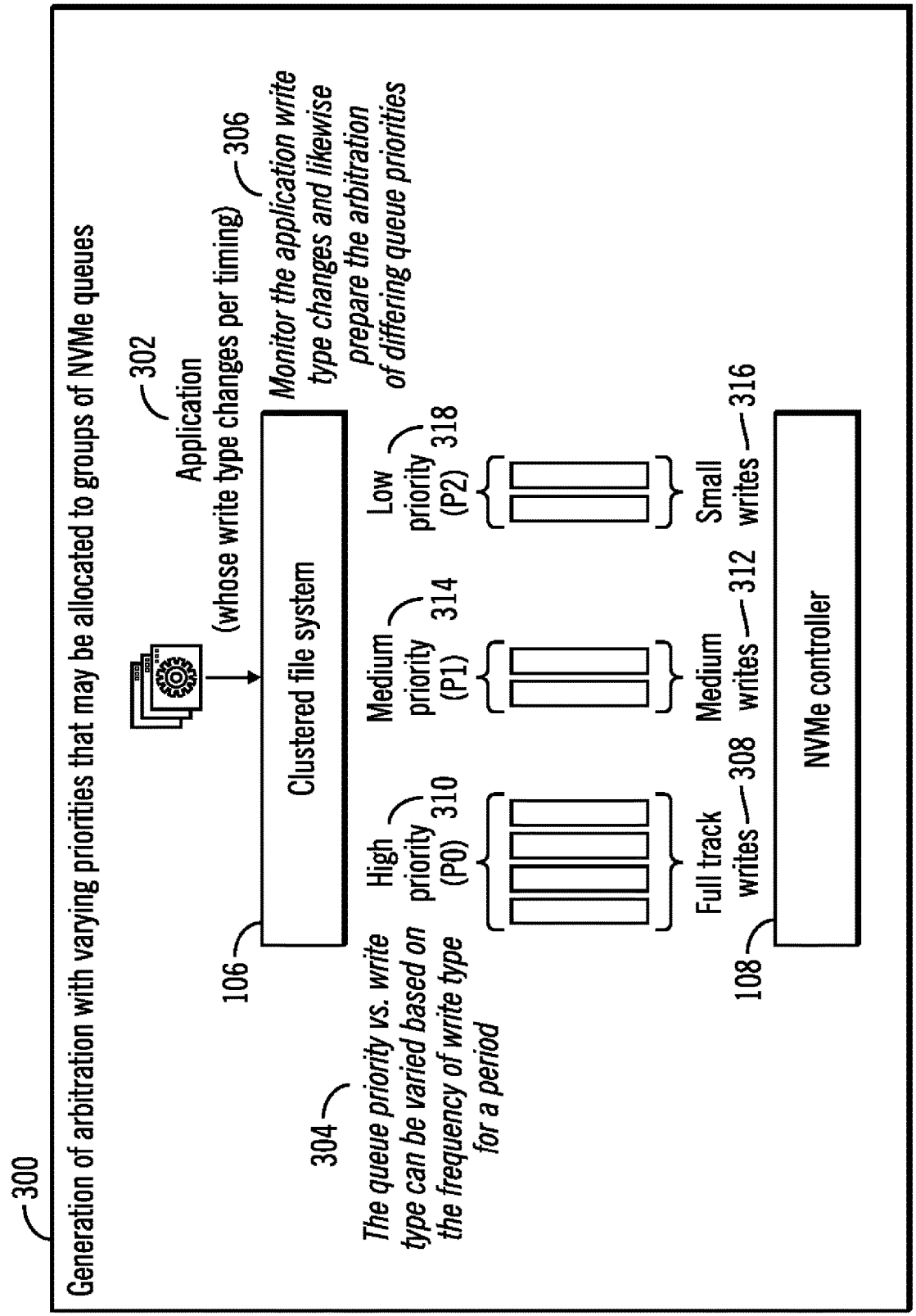
FIG. 3 illustrates a block diagram that shows generation of arbitration with varying priorities that may be allocated to groups of NVMe queues, in accordance with certain embodiments.

FIG. 3 illustrates a block diagram 300 that shows generation of arbitration with varying priorities that may be allocated to groups of NVMe queues, in accordance with certain embodiments.

FIG. 3 shows the generation of an arbitration with varying priorities that may be allocated to groups of NVMe queues where the number of queues to participate in each group are dependent on the I/O rate corresponding to that write type.

The clustered file system 106 monitors the type of I/O operations from an application 302, categorizes the I/Os to full track writes, medium track writes, and small track writes. Along with the categorization, the clustered file system 106 also measures the frequency per write type. Based on the frequency, the clustered file system 106 generates an arbitration (i.e., mapping) with varying priorities that may be allocated to groups of NVMe queues, where the number of queues that participate in each group are dependent on the I/O rate corresponding to that write type. Arbitration priorities are dynamically altered based on the workload changes that result in variations of write frequencies (as shown via reference numerals 304, 306).

For example, in FIG. 3, the full track writes have been placed in a NVMe queue with high priority (shown via reference numerals 308, 310), the medium writes have been placed in a NVMe queue with medium priority (shown via reference numerals 312, 314), and the small writes have been placed in a NVMe queue with low priority (shown via reference numerals 316, 318).

Figure 4:
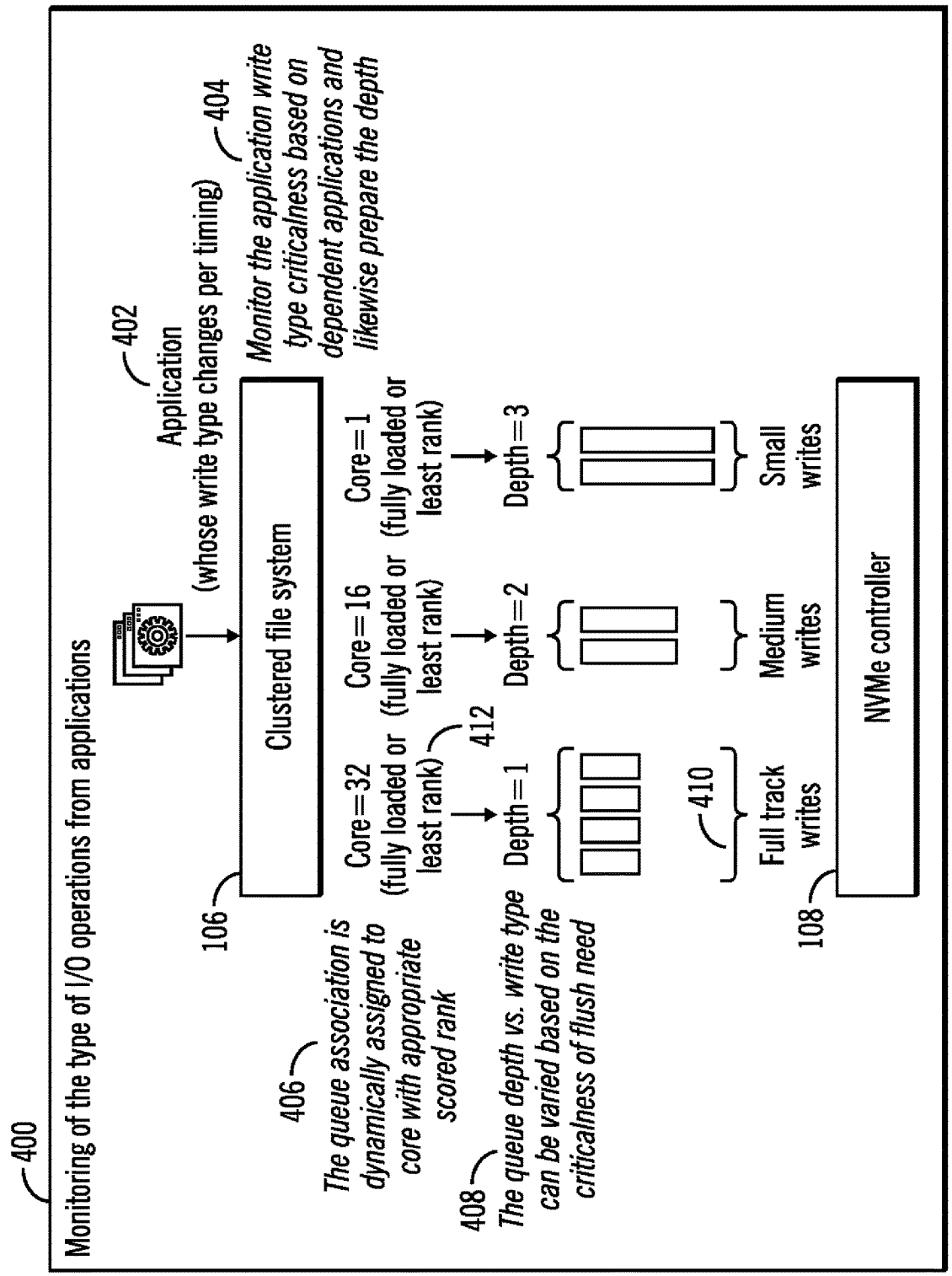
FIG. 4 illustrates a block diagram that shows the monitoring of the type of I/O operations from applications, in accordance with certain embodiments.

FIG. 4 illustrates a block diagram 400 that shows the monitoring of the type of I/O operations from applications, in accordance with certain embodiments. The clustered file system 106 monitors the type of I/O operations from an application, estimates the importance of I/Os during a period and determines whether the I/O need to be flushed quickly to disk or not and associates the I/O to an appropriate processor core.

In certain embodiments (shown via reference numerals 404, 406, 408), the clustered file system 106 monitors the type of I/O operations from an application 402, estimates the importance of I/Os at a time period and determines whether they need to be flushed immediately to disk or may be kept in a virtual queue. The decision is driven based on the array workload, memory spared, overwrites that can be made by an application itself and other dependent tasks such as backup, replication etc. Based on the decision, the clustered file system 106 dynamically alters the queue depth of group of queues channeled for a write category (described in FIG. 3 earlier), to push data substantially immediately to NVMe SSDs or to the data in virtual queues (i.e., submission queues) associated for the write category.

The clustered file system 106 monitors the processor core performances and ranks each processor core based on the monitored history. Based on this ranking, the group associations (including submission queues) are altered to associate high priority queues to best performing processor cores. For example, full track writes given a high priority may be placed in the high priority NVMe queues that are associated with the best performing processor core (as shown via reference numerals 410, 412.

Therefore, FIG. 4 illustrates certain embodiments, in which the write type criticalness of an application is monitored based on dependent applications, to adjust queue depth (reference numeral 404). The queue association is dynamically assigned to the core with appropriate scored rank (reference numeral 406). The queue depth vs. the write type may be varied based on the criticalness of the need for flushing the I/Os (reference numeral 408).

Figure 5:
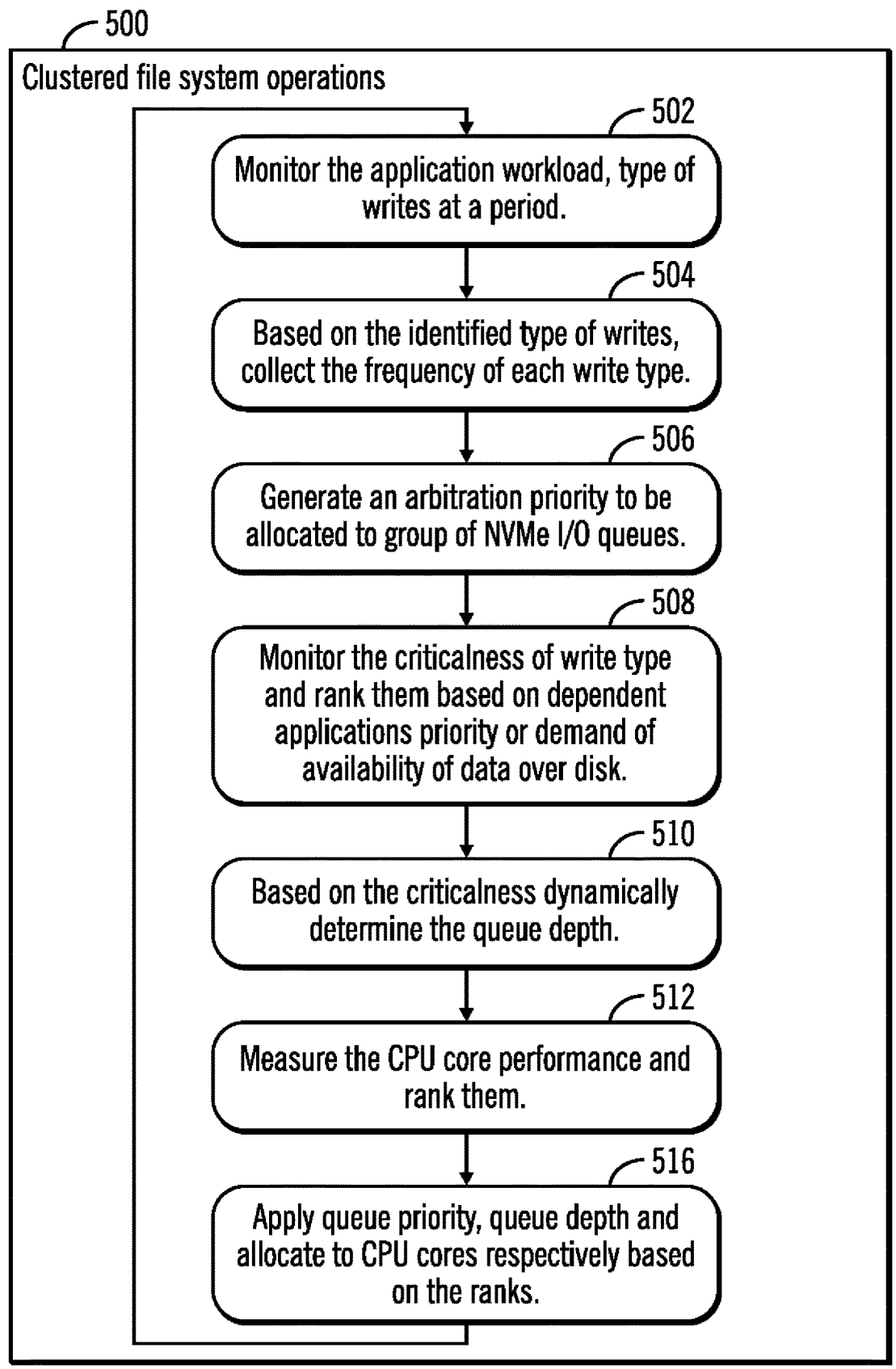
FIG. 5 illustrates a first flowchart that shows clustered file system operations, in accordance with certain embodiments.

FIG. 5 illustrates a first flowchart 500 that shows clustered file system operations, in accordance with certain embodiments. The operations shown in the first flowchart 500 may be implemented by a clustered file system 106 of a computational device 102 that manages a plurality of NVMe devices 104, 107.

Control starts at block 502 in which the clustered file system 106 monitors the application workload and the type of writes at a time period. Based on the identified type of writes, the clustered file system 106 collects (at block 504) the frequency of each write type. The clustered file system 106 then generates (at block 506) an arbitration priority to be allocated to group of NVMe queues.

From blocks 506 control proceeds to block 508 in which the clustered file system 106 monitors the criticalness of write types and ranks them based on priority of dependent applications or demand of availability of data over disk. Based on the criticalness, the clustered file system 106 determines (at block 510) the queue depth.

From block 510 control proceeds to block 512 in which the clustered file system 106 measures the processor (i.e., CPU) core performances and ranks the CPUs based on the performance. The clustered file system 106 applies (at block 516) queue priority, queue depth and allocate writes to CPU cores respectively, based on the ranks of the CPUs and then control returns to block 502.

Figure 6:
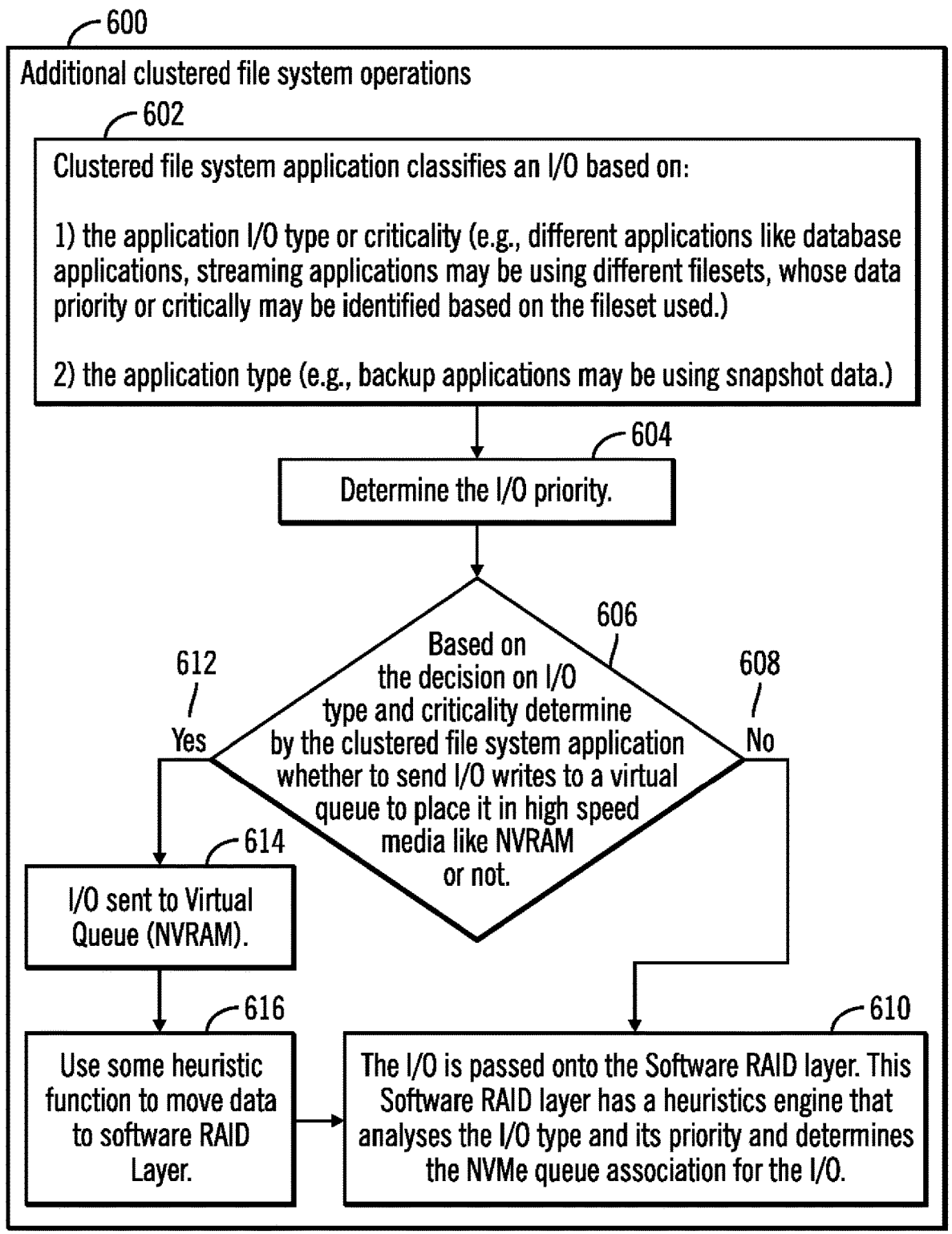
FIG. 6 illustrates a second flowchart that shows additional clustered file system operations, in accordance with certain embodiments.

FIG. 6 illustrates a second flowchart 600 that shows additional clustered file system operations, in accordance with certain embodiments. The operations shown in the second flowchart 600 may be implemented by a clustered file system 106 of a computational device 102 that manages a plurality of NVMe devices 104, 107.

Control starts at block 602 in which the clustered file system classifies an I/O based on:
1) The application I/O type or criticality (e.g., different applications like database applications, streaming applications may be using different filesets, whose data priority or critically may be identified based on the fileset used.); and
2) The application type (e.g., backup applications may be using snapshot data).

From block 602 control proceeds to block 604 in which the I/O priority is determined. Based on the decision on I/O type and criticality, a determination is made at block 606) by the clustered file system application, on whether to send I/O writes to a virtual queue to place it in high-speed media like non-volatile random access memory (NVRAM) or not. If not (branch 608), then the I/O is passed onto a software implemented RAID layer. This layer has a heuristics engine which analyses the I/O type and its priority and determines the NVMe queue association for the I/O.

If at block 606 a determination is made to send the I/O writes to a virtual queue (branch 612) then control proceeds to block 614 where the I/O is sent to the virtual queue comprising a NVRAM. Control proceeds to block 616 where some heuristic function is used to move data to a software RAID Layer, and then control proceeds to block 610.

Figure 7:
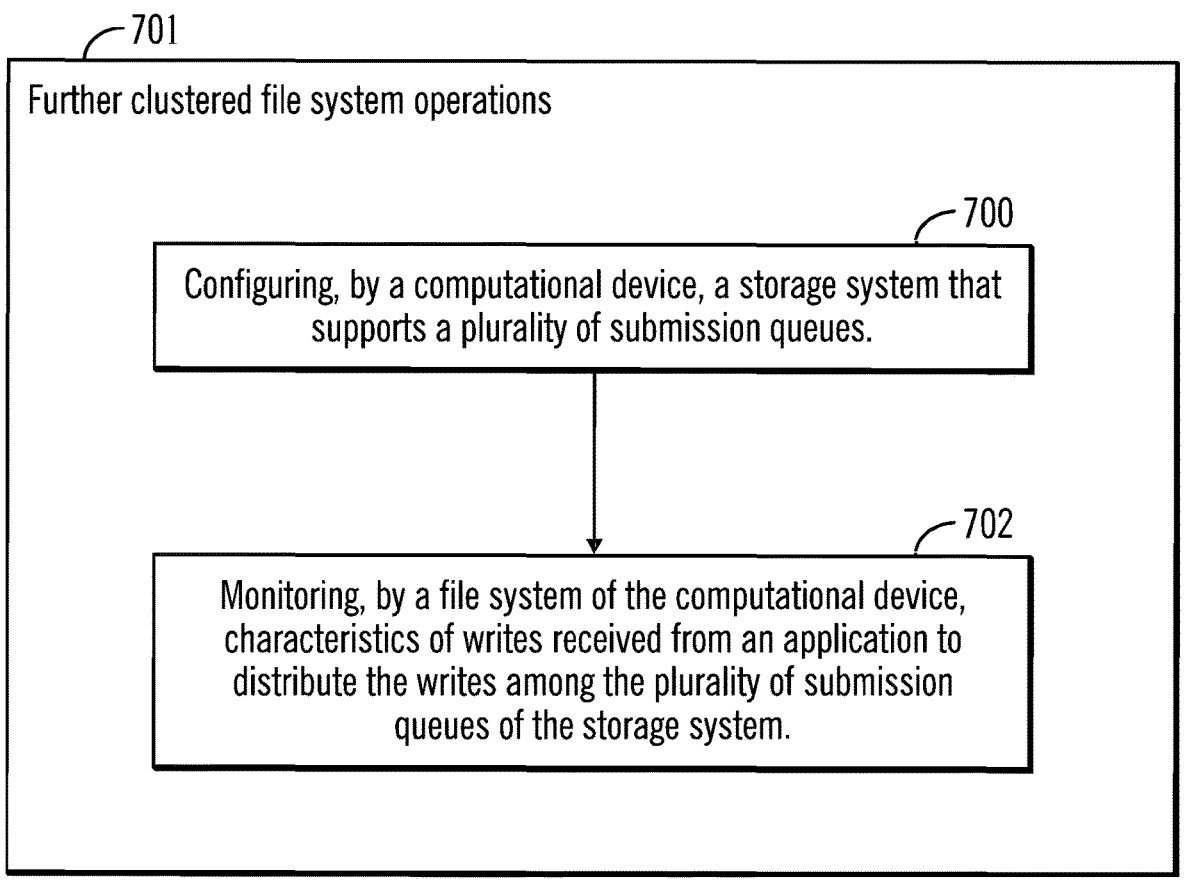
FIG. 7 illustrates a third flowchart that shows further clustered file system operations, in accordance with certain embodiments.

FIG. 7 illustrates a third flowchart 701 that shows further clustered file system operations, in accordance with certain embodiments. The operations shown in the third flowchart 701 may be implemented by a clustered file system 106 of a computational device 102 that manages a plurality of NVMe devices 104, 107.

Control starts at block 700 in which a computational device 102 configures a storage system that supports a plurality of submission queues 110, 112. A file system 106 of the computational device monitors (at block 702) characteristics of writes received from an application to distribute the writes among the plurality of submission queues 110, 112 of the storage system.

Therefore, certain embodiments provide a framework that may be integrated with a clustered file system using a NVMe backend, to improve performance by leveraging hints related to application workload changes and by appropriately channeling writes to NVMe queues (based on queue priority vs. write performance demanded, queue depth vs. write type, queue association change based on processor core performance etc.).

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
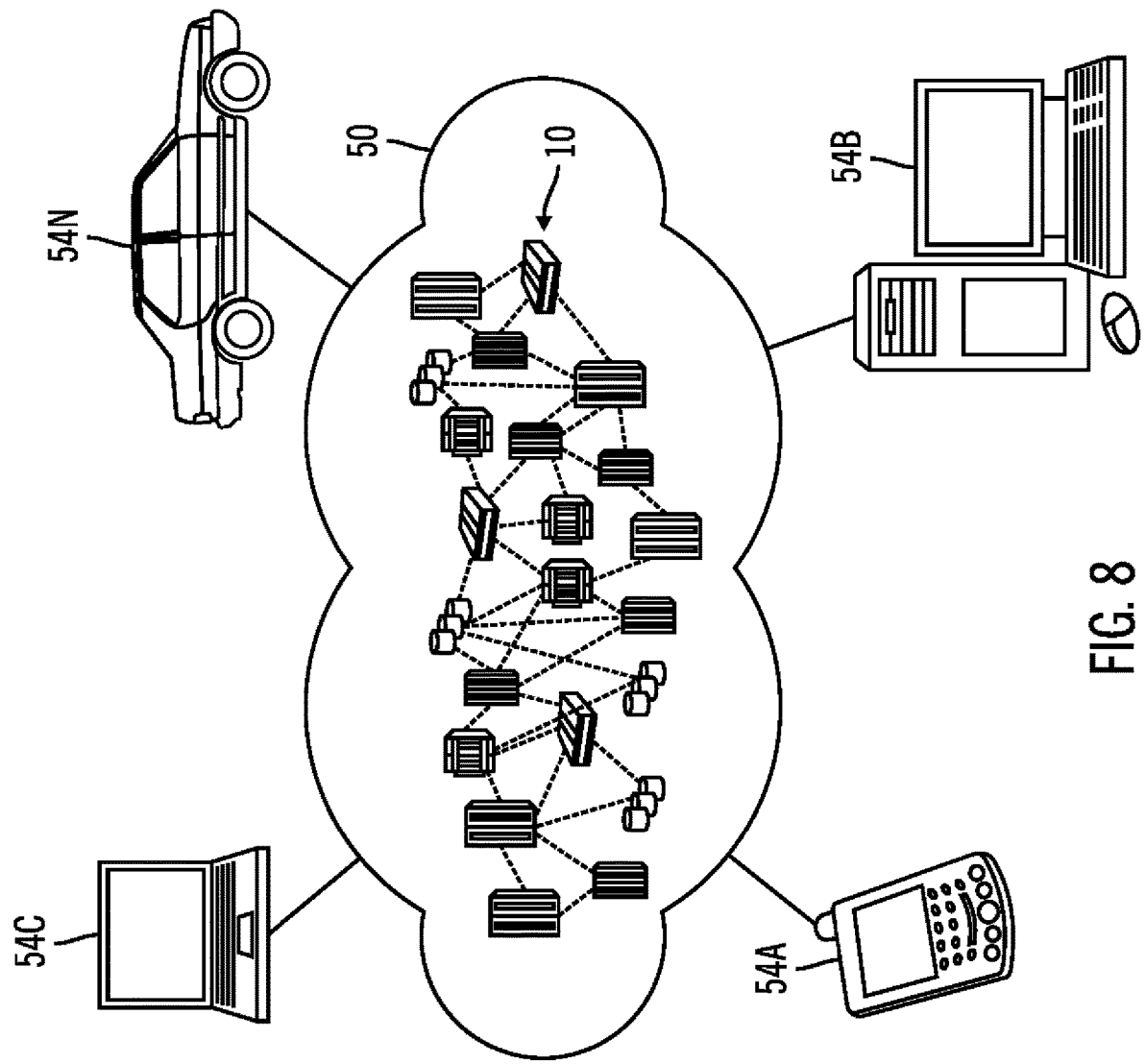
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
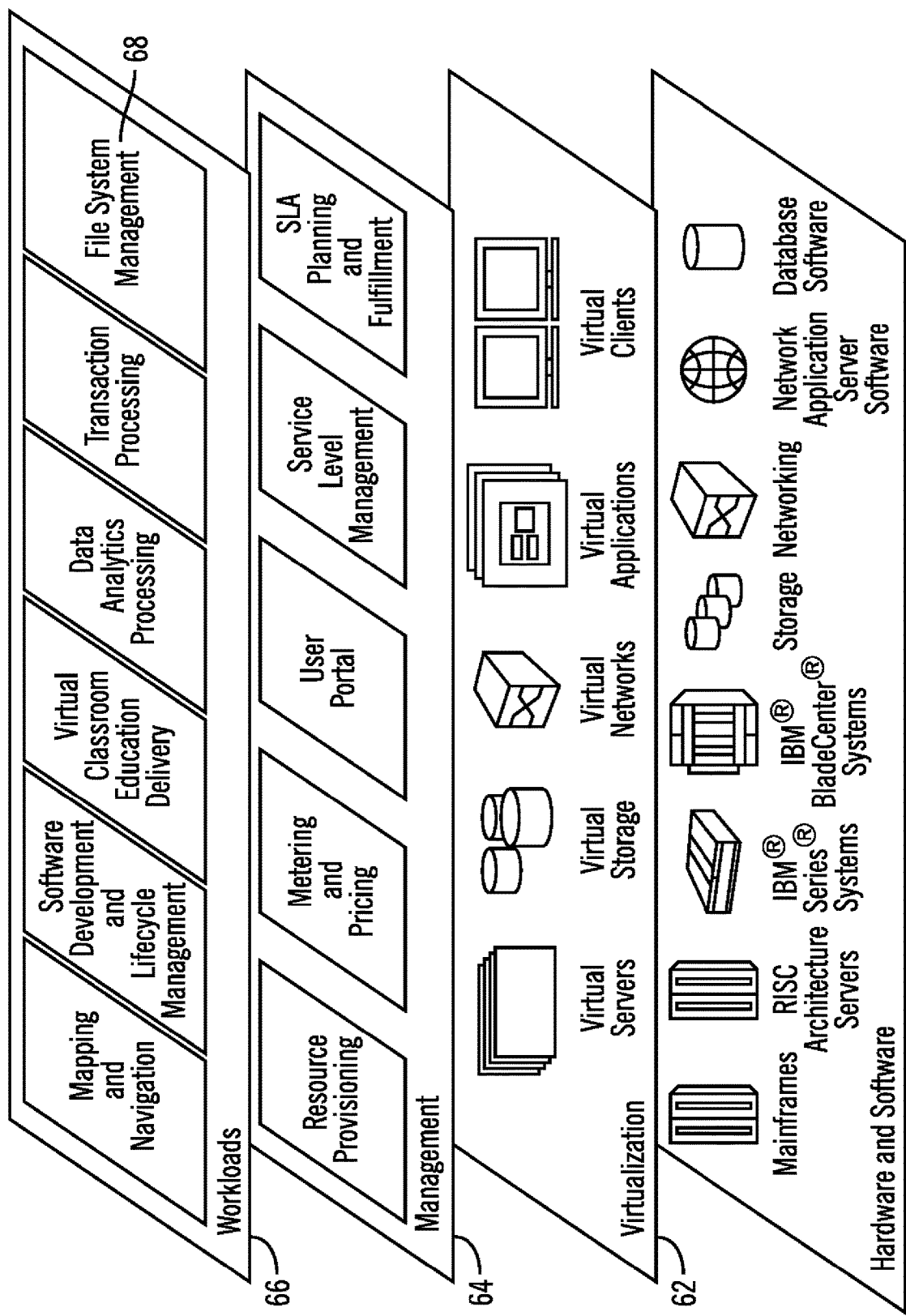
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and file system management 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
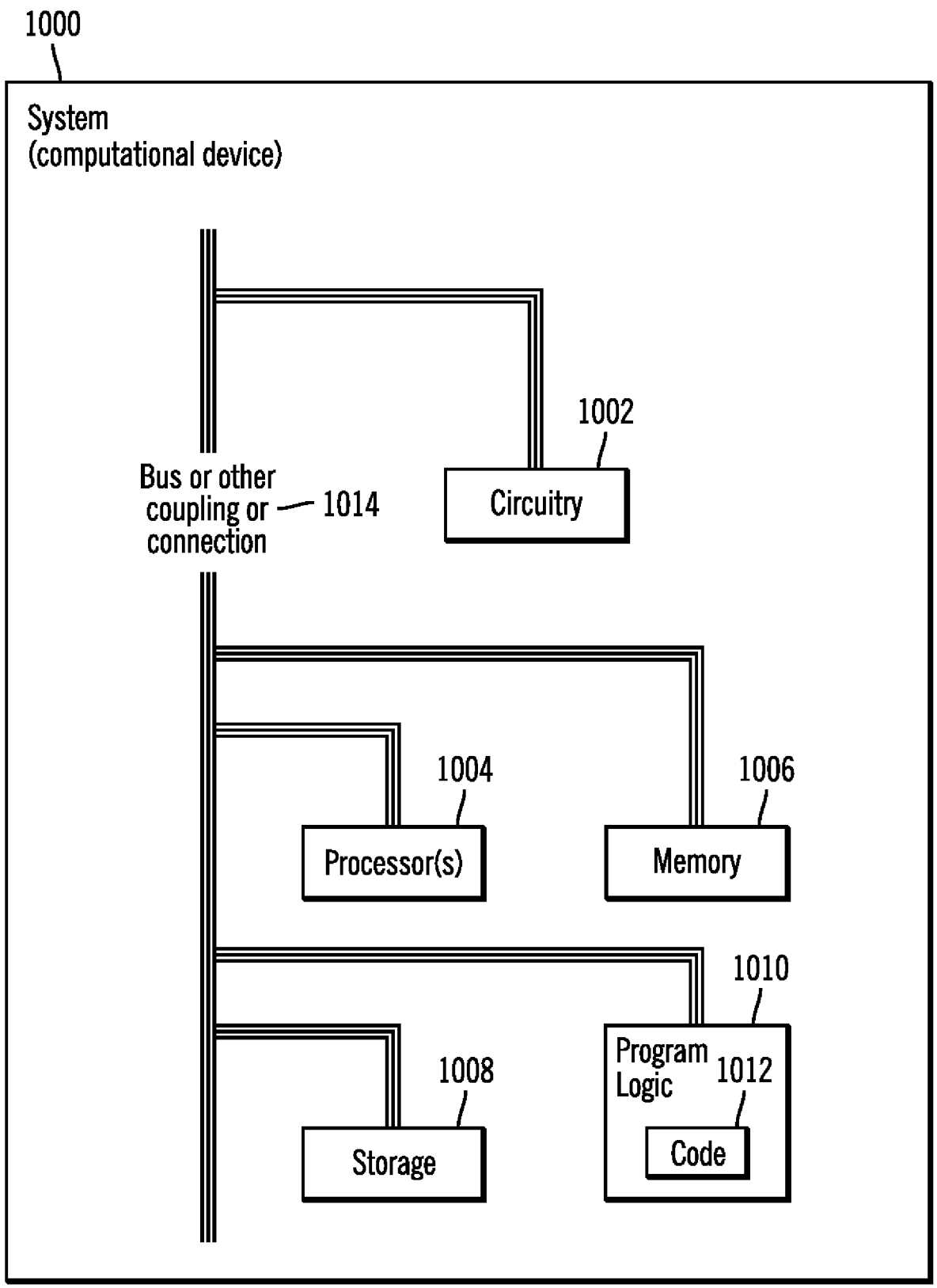
FIG. 10 illustrates a block diagram of a computational system that shows certain elements that may be included in the computational device described in FIGS. 1-9, in accordance with certain embodiments.

FIG. 10 illustrates a block diagram that shows certain elements that may be included in the computational device 102 or other computational devices 118, 120 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
configuring, by a computational device, a storage system that supports a plurality of submission queues; and
monitoring, by a file system of the computational device, characteristics of writes received from an application to distribute the writes among the plurality of submission queues of the storage system, wherein the method further comprises:
categorizing the writes into full track writes, medium track writes, and small track writes; and
measuring a frequency of different categories of writes determined based on the categorizing of the writes, generating arbitrations of the writes with varying priorities for distributing the writes for processing in the plurality of submission queues, wherein a full track write of the full track writes includes writing incoming data blocks of the writes received to a fresh track, in response to a total size of the incoming data blocks being equal to or more than a size of one full track, wherein a medium track write of the medium track writes includes overwriting an existing data track, and wherein a small track write of the small track writes includes staging the incoming data blocks to a caching storage.

2. The method of claim 1, the method further comprising:
monitoring a type of writes received from the application; and
determining whether the writes are to be flushed to a disk or whether to maintain the writes in a virtual queue.

3. The method of claim 1, wherein the plurality of submission queues have queue depths that are altered dynamically for groups of queues channeled for a write category, to push data to non-volatile memory express (NVMe) solid state drives or to hold the data in virtual queues associated with the write category.

4. The method of claim 1, the method further comprising:
monitoring processor core performances and ranking processor cores; and
associating a highest priority submission queue to a highest ranked processor core for processing of the writes.

5. The method of claim 1, wherein the storage system is comprised of non-volatile memory express (NVMe) devices.

6. The method of claim 5, the method further comprising:
distributing the writes among the plurality of submission queues of the storage system based on the characteristics of writes received from the application, and based on the distribution of the writes, a performance of the storage system is improved in comparison to distributing the writes randomly among one or more submission queues of the storage system.

7. A computer program product, the computer program product comprising a computer readable storage medium having computer readable program code embodied therewith, the computer readable program code configured to perform operations, the operations comprising:
configuring, by a computational device, a storage system that supports a plurality of submission queues; and monitoring, by a file system of the computational device, characteristics of writes received from an application to distribute the writes among the plurality of submission queues of the storage system, wherein the operations further comprise:
categorizing the writes into full track writes, medium track writes, and small track writes; and
measuring a frequency of different categories of writes determined based on the categorizing of the writes, generating arbitrations of the writes with varying priorities for distributing the writes for processing in the plurality of submission queues, wherein a full track write of the full track writes includes writing incoming data blocks of the writes received to a fresh track, in response to a total size of the incoming data blocks being equal to or more than a size of one full track, wherein a medium track write of the medium track writes includes overwriting an existing data track, and wherein a small track write of the small track writes includes staging the incoming data blocks to a caching storage.

8. The computer program product of claim 7, the operations further comprising:
monitoring a type of writes received from the application; and
determining whether the writes are to be flushed to a disk or whether to maintain the writes in a virtual queue.

9. The computer program product of claim 7, wherein the plurality of submission queues have queue depths that are altered dynamically for groups of queues channeled for a write category, to push data to non-volatile memory express (NVMe) solid state drives or to hold the data in virtual queues associated with the write category.

10. The computer program product of claim 7, the operations further comprising:
monitoring processor core performances and ranking processor cores; and
associating a highest priority submission queue to a highest ranked processor core for processing of the writes.

11. The computer program product of claim 7, wherein the storage system is comprised of non-volatile memory express (NVMe) devices.

12. The computer program product of claim 11, the operations further comprising:
distributing the writes among the plurality of submission queues of the storage system based on the characteristics of writes received from the application, and based on the distribution of the writes, a performance of the storage system is improved in comparison to distributing the writes randomly among one or more submission queues of the storage system.

13. A system, comprising:
a memory; and
a processor coupled to the memory, wherein the processor performs operations, the operations comprising:
configuring a storage system that supports a plurality of submission queues; and
monitoring, by a file system, characteristics of writes received from an application to distribute the writes among the plurality of submission queues of the storage system, wherein the operations further comprise:
categorizing the writes into full track writes, medium track writes, and small track writes; and
measuring a frequency of different categories of writes determined based on the categorizing of the writes, generating arbitrations of the writes with varying priorities for distributing the writes for processing in the plurality of submission queues, wherein a full track write of the full track writes includes writing incoming data blocks of the writes received to a fresh track, in response to a total size of the incoming data blocks being equal to or more than a size of one full track, wherein a medium track write of the medium track writes includes overwriting an existing data track, and wherein a small track write of the small track writes includes staging the incoming data blocks to a caching storage.

14. The system of claim 13, the operations further comprising:
monitoring a type of writes received from the application; and
determining whether the writes are to be flushed to a disk or whether to maintain the writes in a virtual queue.

15. The system of claim 13, wherein the plurality of submission queues have queue depths that are altered dynamically for groups of queues channeled for a write category, to push data to non-volatile memory express (NVMe) solid state drives or to hold the data in virtual queues associated with the write category.

16. The system of claim 13, the operations further comprising:
monitoring processor core performances and ranking processor cores; and
associating a highest priority submission queue to a highest ranked processor core for processing of the writes.

17. The system of claim 13, wherein the storage system is comprised of non-volatile memory express (NVMe) devices.

18. The system of claim 17, the operations further comprising:
distributing the writes among the plurality of submission queues of the storage system based on the characteristics of writes received from the application, and based on the distribution of the writes, a performance of the storage system is improved in comparison to distributing the writes randomly among one or more submission queues of the storage system.

* * * * *